United States Patent [19]

McCormick et al.

[11] Patent Number: 4,676,142
[45] Date of Patent: Jun. 30, 1987

[54] ADAPTER WITH MODULAR COMPONENTS FOR A ROBOT END-OF-ARM INTERCHANGEABLE TOOLING SYSTEM

[75] Inventors: Peter E. McCormick, Dallas; Rick C. Edwards, Carrollton; Walter D. Autry, Jr., Dallas; Timothy D. Culbertson, Carrollton; Jerome F. Goch, Dallas; Marc S. Linder, Garland, all of Tex.

[73] Assignee: EOA Systems, Inc., Dallas, Tex.

[21] Appl. No.: 728,763

[22] Filed: Apr. 30, 1985

Related U.S. Application Data

[63] Continuation-in-part of Ser. No. 616,974, Jun. 6, 1984, Pat. No. 4,611,377.

[51] Int. Cl.⁴ ............ F01B 31/00; B25J 17/02; B25J 11/00
[52] U.S. Cl. ............................. 92/130 R; 279/4; 901/29; 901/30
[58] Field of Search ............ 279/4, 22, 30, 75; 29/26 A; 901/29, 30; 92/106, 130 R, 130 A

[56] References Cited

U.S. PATENT DOCUMENTS

| | | |
|---|---|---|
| Re. 30,132 | 10/1979 | Irie . |
| 3,118,345 | 1/1964 | Bullard, III et al. ............ 279/4 |
| 3,661,051 | 5/1972 | Dunne et al. ............ 91/35 |
| 3,845,284 | 10/1974 | Taguchi et al. . |
| 3,920,972 | 11/1975 | Corwin, Jr. et al. . |
| 4,011,437 | 3/1977 | Hohn . |
| 4,046,263 | 9/1977 | Cwycyshyn et al. . |
| 4,092,719 | 5/1978 | Salmon ............ 364/468 |
| 4,132,938 | 1/1979 | Sano et al. . |
| 4,227,853 | 10/1980 | Woodford et al. . |
| 4,240,016 | 12/1980 | Inaba et al. . |
| 4,243,923 | 1/1981 | Whitney et al. . |
| 4,281,447 | 8/1981 | Miller et al. ............ 29/568 |
| 4,283,764 | 8/1981 | Crum et al. . |
| 4,305,130 | 12/1981 | Kelley et al. . |
| 4,362,978 | 12/1982 | Pollard et al. . |
| 4,374,349 | 2/1983 | Inaba et al. . |
| 4,398,720 | 8/1983 | Jones et al. . |
| 4,488,241 | 12/1984 | Hutchins et al. . |
| 4,549,846 | 10/1985 | Torii et al. ............ 901/30 X |

FOREIGN PATENT DOCUMENTS 2092776  8/1982  United Kingdom .

OTHER PUBLICATIONS

"FIG. 2.3 TV Robot Drilling Unit Schematic".
Mosaic, "Automating the Assembly Line", vol. 7, No. 5, Sep./Oct. 1976.
General Dynamics Corp., "A Proposal for Intelligent Task Automation", Aug. 13, 1982.

Primary Examiner—Robert E. Garrett
Assistant Examiner—Mark A. Williamson
Attorney, Agent, or Firm—Glaser, Griggs & Schwartz

[57] ABSTRACT

An improved adapter is provided for an interchangeable robot end-of-arm tooling system. The quick change adapter is made from modular components including a body, an interface package, and a robot adapter plate with locator system.

7 Claims, 8 Drawing Figures

ADAPTER WITH MODULAR COMPONENTS FOR A ROBOT END-OF-ARM INTERCHANGEABLE TOOLING SYSTEM

CROSS-REFERENCE

This application is a continuation-in-part application of Ser. No. 06/616,974 filed on June, 6, 1984 now U.S. Pat. No. 4,611,377, entitled "Interchangeable Robot End-of-Arm Tooling System".

TECHNICAL FIELD

This invention relates to robotic tooling systems, and more particularly to an end-of-arm tooling system having interchangeable tools and operating under computer control.

BACKGROUND ART

It is known in the art to provide an articulated robot arm capable of accurately positioning the end of the arm at a given location within a work cell. It is also known to provide robot arms with relatively limited computer control adapted primarily to positioning the end of the arm. These prior art robot arms are useful only with dedicated end-of-arm tooling capable of performing one task, for example, loading/unloading articles or welding. At present there exists a large gap between robot arm technology and tooling technology related to tasks that can be performed at the end of the robot arm.

The result of this technology gap has been the slowing of flexible automation implementation into manufacturing facilities. A further inhibiting factor in implementing robots onto the factory floor has been the lack of an end-of-arm tooling system that is interchangeable among many tools. Because this interchangeable feature has not been available, applications which are ideally suited for interchangeable tooling have not been considered for flexible automation. Instead, robot applications have been limited to using dedicated tooling that can perform only one task. Thus, there presently exists a need for a robot end-of-arm tooling system that allows the robot to perform multiple tasks within a single work station. To allow adaptability to a variety of presently available robot arm systems, the tooling system should include its own control system in communication with and readily adaptable to controllers of presently existing robot arms.

SUMMARY OF THE INVENTION

The present invention is an improved adapter for use in an robot end-of-arm interchangeable tooling system that allows a variety of intelligent tools to be picked up and replaced by a single robot arm and to be operated under independent computer control. The improved adapter is mounted to the robot arm and picks up and replaces any one of a family of manufacturing and assembly tools.

The adapter is made from modular components to improve ease and expense of manufacture. The modules include a body module and an interface module.

BRIEF DESCRIPTION OF THE DRAWINGS

A more complete understanding of the invention and its advantages will be apparent from the Detailed Description taken in conjunction with the accompanying Drawings in which.

DETAILED DESCRIPTION

Figure 1:
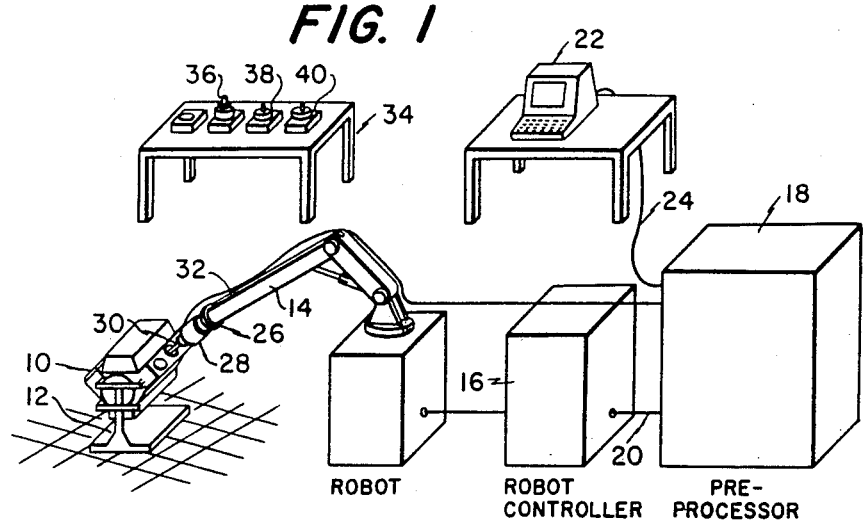
FIG. 1 is a schematic perspective view of the environment of the present invention.

Referring initially to FIG. 1, the present invention is illustrated in the environment of a factory where complex parts, such as engine block 10, are manufactured. Engine block 10 is fixed with respect to the factory floor by fixture 12. The robot end-of-arm interchangeable tooling system illustrated in FIG. 1 is adapted for use with a commercially available robot arm 14. By way of example, robot arm 14 could be a Model 776 manufactured by Cincinnati-Milacron of Cincinnati, Ohio. Robot arm 14 includes a robot controller 16. Robot controller 16 includes a computerized controller, but the lack in power and sophistication of the standard robot controller supplied with available robot arms precludes all uses of the robot arms other than simple positioning of the end of the arm with dedicated tooling.

The tooling system of the present invention includes a preprocessor 18, which is a computer controller specifically adapted for use with the tooling system. Preprocessor 18 is connected to the robot controller by means of cable 20. A terminal 22, with keyboard and display, is connected to the preprocessor 18 by cable 24. Adapter 26 is permanently attached to the end of robot arm 14. Tool 28 is shown attached to the adapter, and in the situation illustrated in FIG. 1, tool 28 is a drill having drill bit 30 positioned to drill a hole in engine block 10. A group of cables and hoses, generally indicated by reference numeral 32, connects adapter 26 to robot controller 16, and supplies the adapter 26 with electrical power, compressed air, coolant, and data communications to and from the rest of the system. Table 34 holds additional tools 36, 38, and 40, which, by way of example, could include grippers, nut runners, or other tools. The essential object of this invention is to enable robot arm 14 to interchange between tools of 28, 36, 38 and 40 and perform tasks using these tools, all by computer control provided by preprocessor 18. In the preferred embodiment of the invention, the system includes preprocessor 18, with associated terminal 22, adapter 26, and a number of tools, such as drill 28 and tools 36, 38 and 40.

Figure 2:
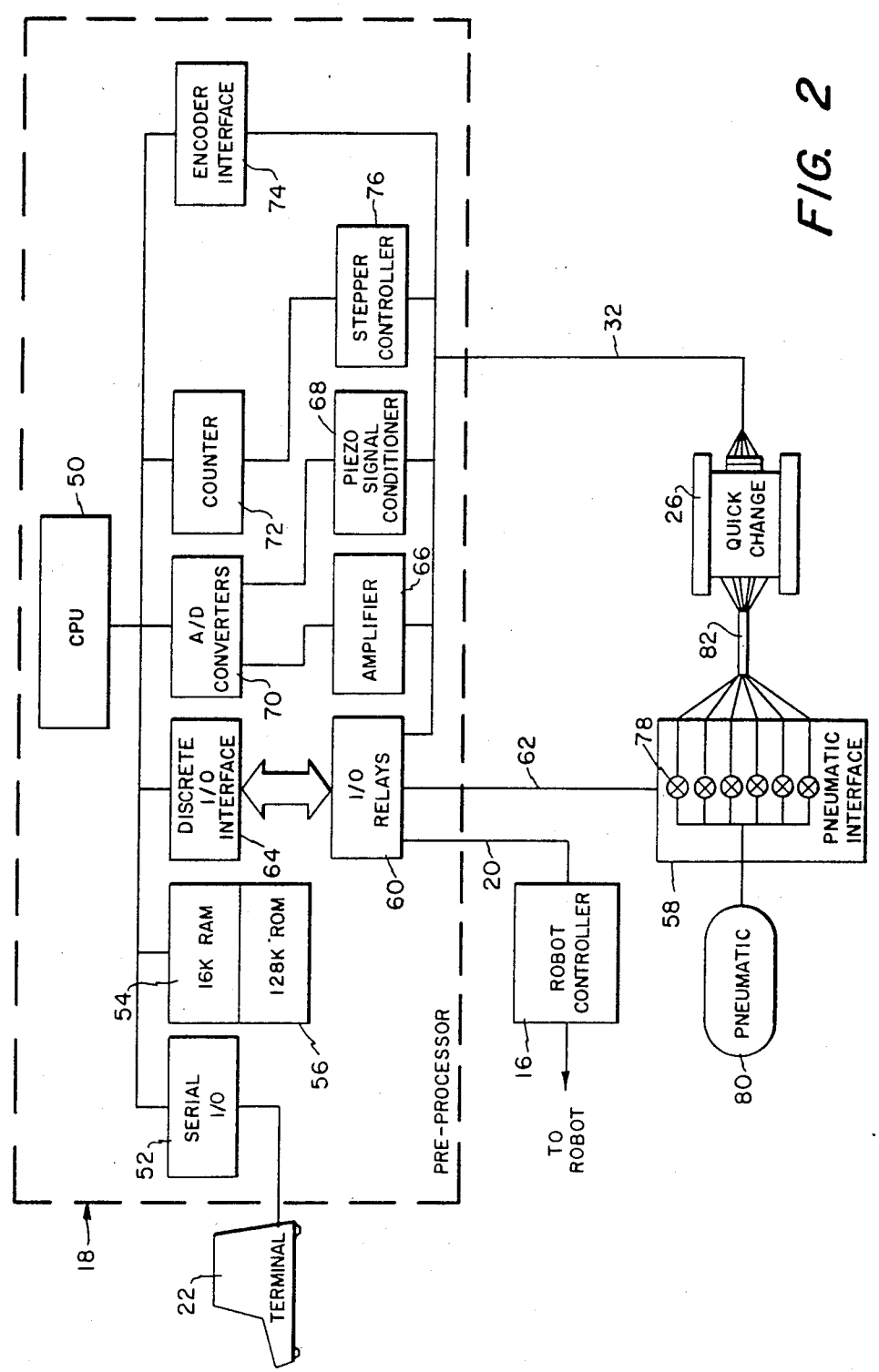
FIG. 2 is a schematic of the control system used in the system.

Referring now to FIG. 2, preprocessor 18 includes CPU board 50, which in the preferred embodiment is a self-contained board designated by model number 3830 and manufactured by ISI Inc. of Sunnyvale, Calif. CPU board 50 is connected to various input/output boards and memory boards. Serial I/O board 52 is connected to terminal 22 by cable 24. In the preferred embodiment, serial I/O board 52 is a model number 3711 board manufactured by ISI, Inc. Preprocessor 18 includes RAM 54 and ROM 56. The RAM is provided on a model number 3220-1 board manufactured by ISI, Inc., and the ROM is provided on two model number 7705 boards manufactured by Prolog Corporation of Monterey, Calif. These cards provide 16K bytes of RAM and 128K bytes of ROM. Preprocessor 18 communicates with the rest of the system through a bank of discrete I/O solid state relays 60. In the preferred embodiment, relay bank 60 comprises four model number PB-24 relay boards manufactured by Opto 22 of Huntingdon Beach, Calif. Relay bank 60 is connected to pnuematic interface 58 by means of cable 62. The status of the I/O relays in bank 60 is read by discrete I/O interface board 64 connected to CPU board 50. In the preferred embodiment, discrete I/O interface board 64 is a model number 7507 board manufactured by Prolog Corp. Certain tools in the systems generate analog measurement signals. Amplifier 66 is used to amplify strain gage type signals, and in the preferred embodiment is a model number 3170 board manufactured by Daytronic of Miamisburg, Ohio. Other transducers in the system are piezoelectric transducers. Piezoelectric signal conditioner 68 is provided to analyze signals from these transducers, and in the preferred embodiment, is manufactured by PCB Piezp, Inc. of Depew, N.Y. The outputs of amplifier 66 and piezoelectric signal conditioner 68 are connected to an analog-to-digital converter board 70, which preferably is a model number 3830 board manufactured by ISI, Inc. Counter board 72 is provided to drive the stepper motors that are included in some of the tools and also to read the speed of rotation from certain pneumatic motors in the tools. In the preferred embodiment, counter board 72 is a model number 7206 manufactured by Prolog Corporation. Encoder interface board 74 is provided to read linear encoders provided in some tools, and preferably is a unit manufactured by Contemporary Control Systems, Inc. of Downers Grove, Ill. Finally, stepper controller board 76 is provided to enable operation of the stepper motors in the tools. In the preferred embodiment, stepper controller board 76 is a model number MIC8271-board manufactured by Kiowa Corporation of Eden Prairie, Minn.

Pneumatic interface 58 includes a number of electric valves 78 operated by preprocessor 18 through the relay bank 60. The pnuematic interface is connected to pnuematic pressure source 80. The output of each valve 78 is connected to adapter 26 by means of a hose 82.

Figure 3:
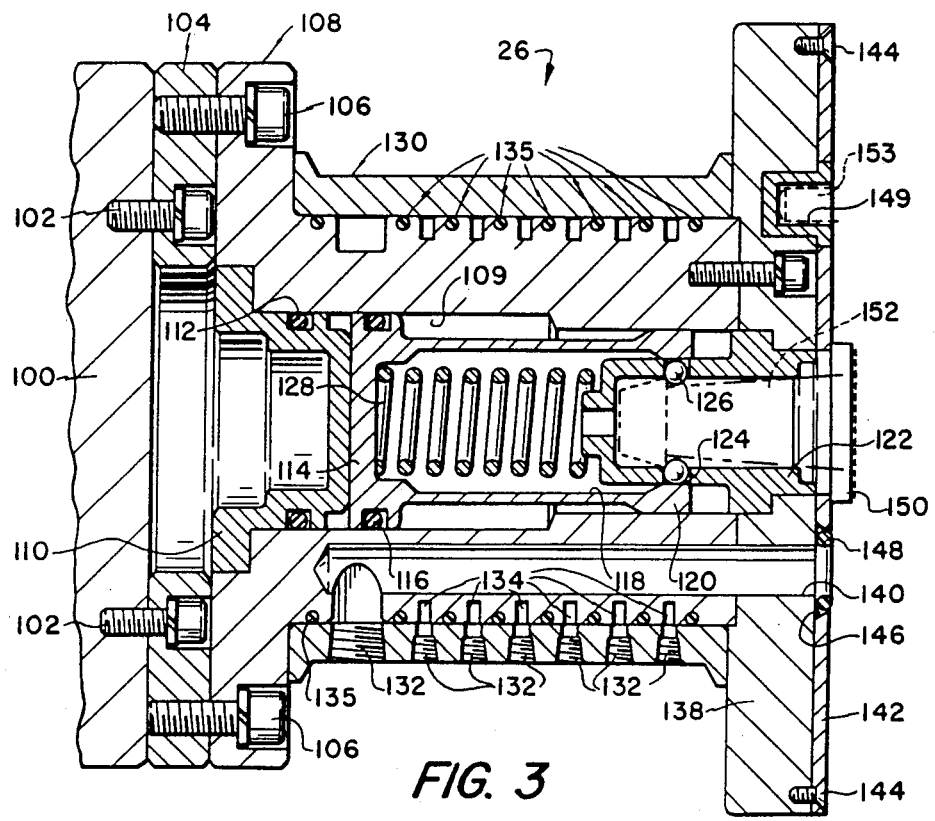
FIG. 3 is a partially broken away side view of a first embodiment of an adapter for use in the system.
Figure 4:
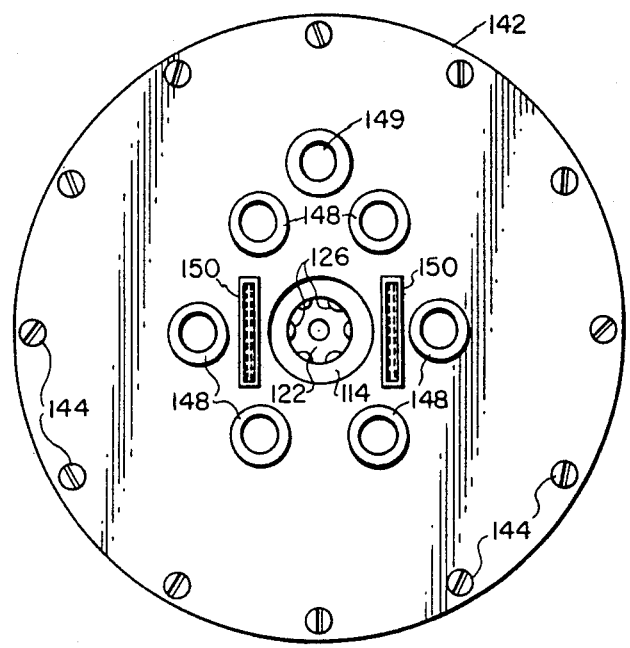
FIG. 4 is an end view of the adapter of FIG. 3.

Referring now to FIGS. 3 and 4, adapter 26 is permanently mounted to end 100 of robot arm 14 by means of a number of bolts 102 through mounting member 104. Attached to mounting member 104 by means of bolts 106 is main body 108. Disposed within an interior cavity 109 of main body 108 is plug member 110, which carries O-ring 112 to seal the interior cavity of main body 108. Piston 114 is mounted within the interior cavity 109 of main body 108 and carries O-ring 116. Piston 114 includes an inner cavity 118 and is adapted to reciprocate within cavity 109 of main body 108. In addition, piston 114 includes a lip portion 120 having a smaller inner diameter than inner cavity 118. Receiver 122 is fixed within a portion of piston 114. Receiver 122 includes a number of holes 124 which constrain balls 126. Spring 128 is trapped within cavity 118 of piston 114 and urges piston 114 away from receiver 122. Sleeve 130 is rotateably mounted upon an outer surface of main body 108. Sleeve 130 includes a plurality of ports 132 located therein, each of which communicates with a groove 134 in main body 108. Each groove 134 communicates with a passageway 136 through main body 108. O-rings 135 separate grooves 134 from each other. Flange 138 is attached to main body 108, and contains a passageway 140 in communication with each passageway 136. Endplate 142 is attached to flange 138 by means of screws 144. Endplate 142 includes a number of holes 146 corresponding to each of passageways 140 in flange 138. Each hole 146 has an inwardly-facing conical wall to trap an O-ring 148 against the outer surface of flange 138 adjacent to each passageway 140. Locator bushing 149 is disposed within flange 138 and endplate 142. Attached to endplate 142 are electrical connectors 150.

In operation, adapter 26 enables the system to pick up and drop off tools by a pneumatically actuated locking mechanism. The locking mechanism is comprised of piston 114, balls 126 and receiver 122. One of the ports 132 communicates by way of an associated groove 134 with interior cavity 109 between O-rings 112 and 116. Application of pneumatic pressure to interior cavity 109 between O-rings 112 and 116 causes piston 114 to move against the pressure of spring 128 towards receiver 122. This movement of piston 114 causes lip portion 120 to move away from balls 126, releasing balls 126 for outward movement. As will be described below, each of the tools used in the system includes a probe 152 having an enlarged end and a locator pin 153 shown in dotted lines in FIG. 3. When piston 114 is moved under pressure towards receiver 122, balls 126 are released outwardly to enable the enlarged end of probe 152 to pass by balls 126. When pressure on piston 114 is released, lip portion 120 forces balls 126 inwardly to block the probe 152 in receiver 122. Locator pin 153 of the desired tool fits into locator bushing 149 and aligns the tool with respect to adapter 26. The desired tool to be used in an operation may require one or more pneumatic connections, depending on the type of the tool. Some tools also require connection to a cutting coolant supply. These connections are made through ports 132 in sleeve 130, grooves 134 and passageways 136 and 140. The desired tool has a passageway that mates with a particular passageway 140 and associated O-ring 148 when the tool is locked into position. Ring 130 is rotatable with respect to main body 108, robot arm 14, and the attached tool. Therefore, end 100 of the robot arm 14 and attached tool may be rotated freely with respect to the pneumatic and coolant lines attached to adapter 26 through sleeve 130. Alternatively, in environments where rotation of the robot arm and tool is not required, pneumatic and coolant connections can be made through threaded ports in main body 108 and the rotatable sleeve 130 may be omitted.

Figure 6:
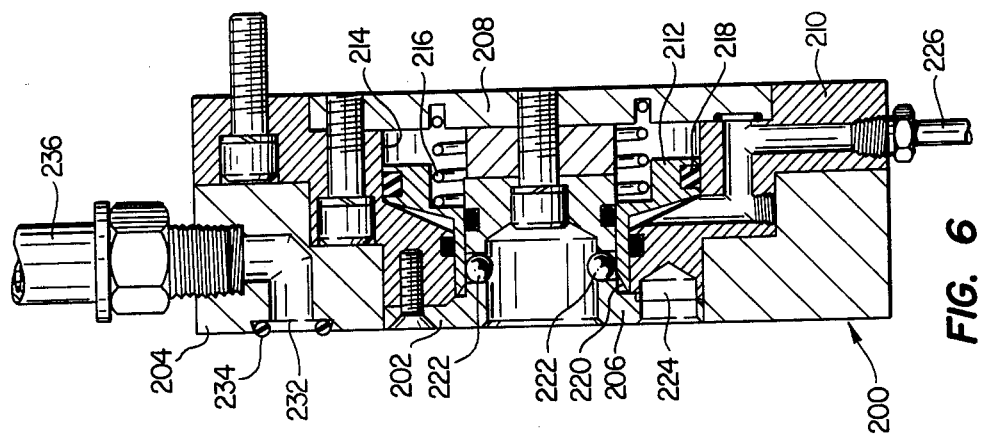
FIG. 6 is a partially broken away side view of the adapter of FIG. 5.
Figure 5:
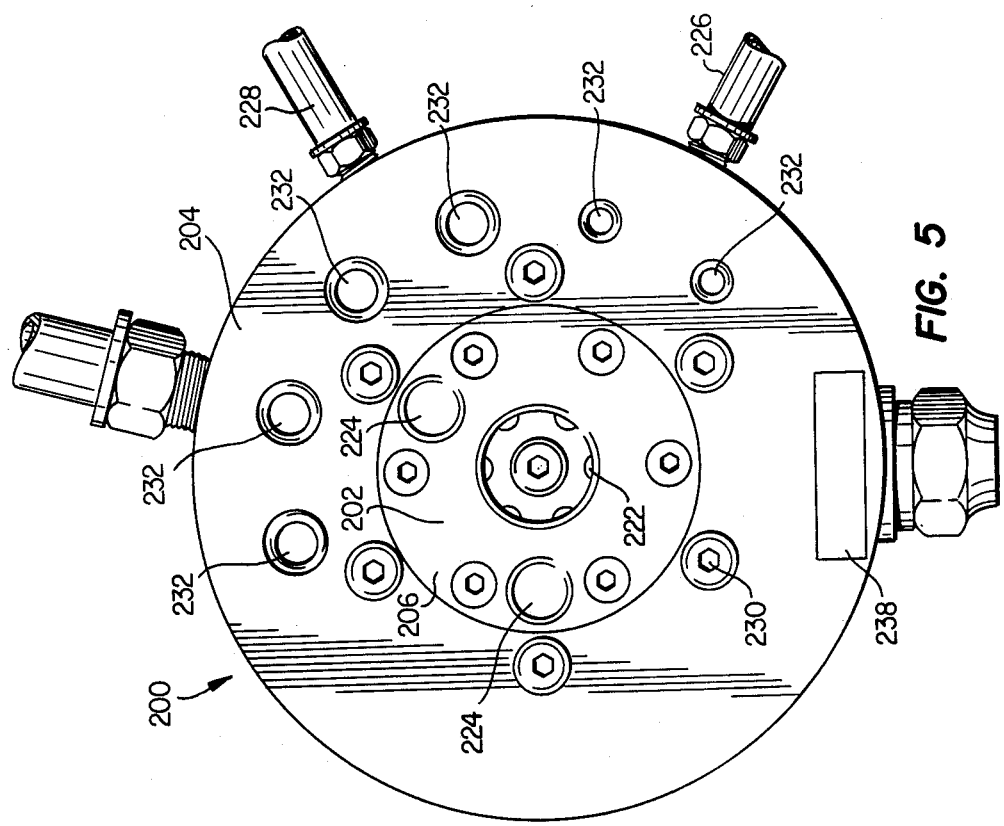
FIG. 5 is an end view of the improved adapter of the present invention.

Referring now to FIGS. 5 and 6, the improved adapter 200 of the present invention is illustrated. Adapter 200 is comprised of two modules, body module 202 and interface module 204. The essential feature of this invention is that interface module 204 can be readily removed from body module 202 in order to change the control and porting characteristics of the adapter without removing or disturbing the alignment of body module 202 with its associated means for disengageably locking the tools to the body module.

Body module 202 includes receiver 206, base 208 and cylinder element 210. Piston 212 is confined within cylindrical walls 214 of cylinder element 210. Spring 216 biases piston 212 away from base 208. Piston 212 includes a seal 218 to enable sealed axial movement within cylinder element 210. Piston 212 also includes frustoconical surface 220 adapted to engage balls 222. Indexing holes 224 are provided in receiver 206 and cylinder element 210 and are located less than 180° apart. A first port 226 communicates with a first side of piston 212, and a second port 228 communicates with the other side of piston 212. In operation, spring 216 operates to bias piston 212 towards receiver 206 thereby forcing balls 222 inwardly by means of frustoconical surface 220. Fluid pressure applied to first port 226 causes piston 212 to move axially against the pressure of spring 216, thereby freeing balls 222 to move outwardly. Piston 212 is double acting, such that fluid pressure applied to second port 228 aids spring 216 in causing piston 212 to trap balls 222 in the inward position. In the event of fluid pressure failure, spring 216 would act to maintain balls 222 in the trapped position.

Interface module 204 is removably connected to body module 202 by means of screws 230. Interface module 204 includes a plurality of ports 232 each consisting of a trapped O-ring 234 extending from the surface of the interface module. A hose 236 is associated with each port 232 and supplies, for example, pneumatic pressure for powering a tool connected to the adapter 200. Electrical connector 238 is provided on the surface of interface module 204 for interfacing the robot end-of-arm tooling system to the tools to be connected to the adapter 200.

Figure 8:
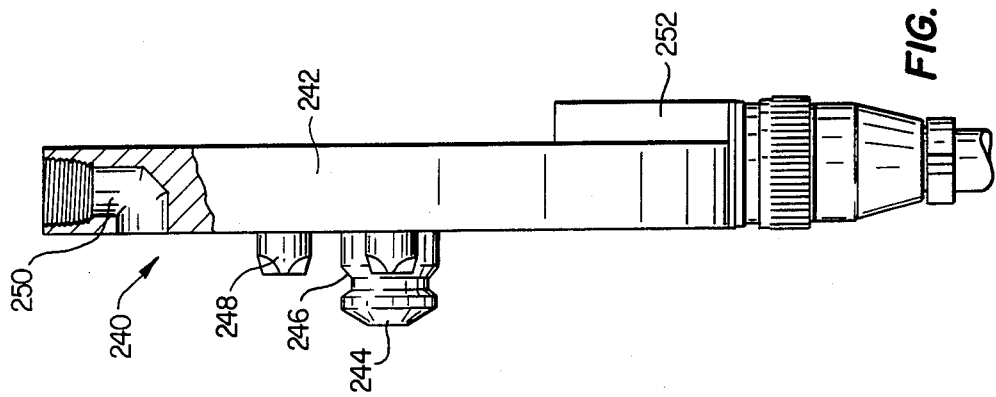
FIG. 8 is a partially broken away side view of the tool plate of FIG. 7.
Figure 7:
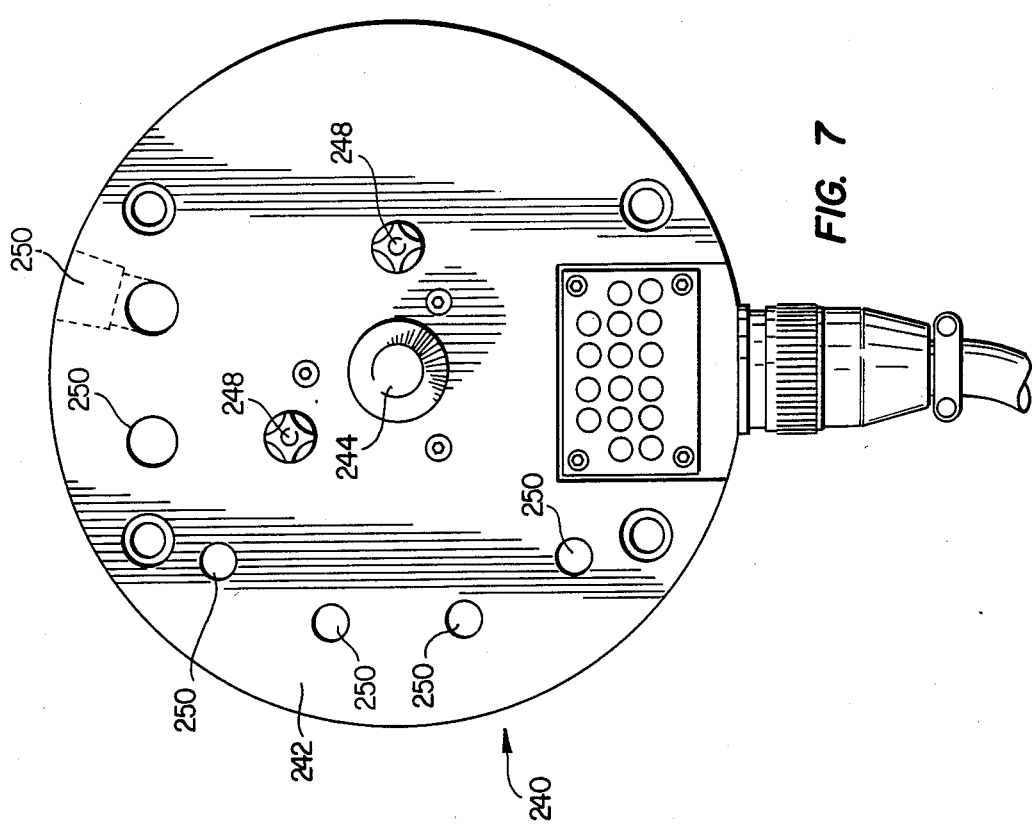
FIG. 7 is an end view of a tool plate for use with the adapter of the present invention.

Referring now to FIGS. 7 and 8, tool plate 240 includes base 242 adapted for permanent connection to one of the tools in the system. Locking stud 244 extends from the surface of base 242 and includes a groove 246. Locating pins 248 also extend from the surface of base 242 and are spaced apart to correspond with holes 224 in adapter 200. Base 242 also includes a number of ports 250 adapted to correspond with ports 232 in adapter 200. Similarily, electrical connector 252 corresponds with electrical connector 238 in adapter 200. Locking stud 244 is sized such that balls 222 fixedly engage groove 246 when the stud is fully inserted into receiver 122 and piston 212 is caused to move towards the receiver.

In operation, the adapter illustrated in FIGS. 5 and 6 working in conjunction with the tool plate illustrated in FIGS. 7 and 8 offers numerous advantages over the first embodiment of an adapter shown in FIGS. 3 and 4. In the first embodiment of the adapter, coupling is achieved using a single acting cylinder which utilizes pneumatic pressure to render the adapter in the release state. The adapter of FIGS. 3 and 4 is rendered in the coupled state when pressure is removed allowing spring 128 to drive piston 114 down around balls 126 forcing them in and thus locking around the locking stud 152. Fluid and pneumatic porting is run through the body of adapter 26 before exiting the adapter. This method of porting makes manufacturing difficult in that a substantial number of the components of adapter 26 must be changed when the porting requirements change. In addition, porting through the body of the adapter greatly increases the length of the adapter. It has been found that the overall length of the adapter is a critical parameter in ensuring adequate tolerances for the tools. Porting the interface connections through the body of the adapter also requires that the entire adapter be removed when the interface requirements are changed. Removal of the adapter disturbs the programming of the system, because the locking mechanism cannot be replaced in exactly the same location after removal.

The improved adapter of the present invention addresses these drawbacks inherent in the adapter of the prior design. The fluid and pneumatic porting has been removed from the adapter body and consolidated into the interface module 204. Interface module 204 includes all porting, O-ring seals and electrical contacts and when bolted to a body module 202 creates an adapter 200. Thus, only interface module 204 need be remanufactured when the porting and/or electrical requirements vary. Also, maintenance is greatly facilitated in that in the event of damage to a port or electrical contact, the interface module 204 may be removed while the body module 202 remains on the robot. The demands of users of the system can be met more readily, because different interface modules 204 for different tools are all usable with a common body module 202.

Locating the porting and electrical interfaces in the interface module 204 and out of the body of the adapter has enabled the length of the adapter to be greatly reduced. In the case of Applicants' system, the reduction in length was from approximately 6.5 inches to 2.5 inches, which represents a major improvement.

Coupling of the tools is achieved by utilizing double acting piston 212 to couple and release the adapter. A double acting cylinder is preferable, because coupling is much faster and more powerful when powered by pneumatic pressure in addition to spring pressure. The spring is also utilized as a fail-safe feature, in that if pressure is lost the adapter will not uncouple. In Applicants' system, the double acting piston over the previous single acting piston improved coupling speed from 1.5 seconds to 0.5 seconds.

The adapter of the present invention can couple with the tool plate 240 in only one angular relationship, due the less than 180° angle between holes 224 and corresponding pins 248. Of course, the same advantage would be gained if the holes were in the tool plate and the pins were extending from the adapter.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. An adapter for use in connecting a tool to the end of a robot arm the tool having a locking element, comprising:
   a first module connected to the end of the robot arm;
   means disposed on the first module for disengageably locking the tool to the adapter by means of rigid engagement with the tool's locking element;
   a second module attached to the first module;
   a plurality of interface connectors disposed on the second module for establishing connections between the tool and interface passageways within the second module; and
   the second module being removable from the first module without removing the first module from the end of the robot arm.

2. The adapter of claim 1 wherein the means for disengageably locking the tool comprises a spring-loaded piston actuated to a disengaged position by fluid pressure in a first fluid passageway.

3. The adapter of claim 2 wherein the piston causes a plurality of balls within a receiver element to grip a portion of the tool extending into the receiver when fluid pressure in the first fluid passageway is released.

4. The adapter of claim 3 wherein the piston is double acting such that fluid pressure in a second fluid passageway actuates the piston to a locked position and the spring operates to maintain tool coupling if fluid pressure in the second fluid passageway is inadvertently released.

5. The adapter of claim 1 further comprising means for locating the tool in a particular angular relationship with respect to the first module.

6. The adapter of claim 5 wherein the means for locating the tool comprises at least two holes in the first module located less than 180 degrees apart and adapted for receiving corresponding pins projecting from the tool.

7. The adapter of claim 5 wherein the means for locating the tool comprises at least two holes in the first module located less than 180 degrees apart and adapted for insertion in corresponding holes located in the tool.

* * * * *